(12) United States Patent
Sarnaik

(10) Patent No.: US 9,501,718 B1
(45) Date of Patent: Nov. 22, 2016

(54) IMAGE-BASED CONTROL OF LIGHTING SYSTEMS

(71) Applicant: MARVELL INTERNATIONAL LTD., Hamilton (BM)

(72) Inventor: Prabhanjan Vijaykumar Sarnaik, Maharashtra (IN)

(73) Assignee: MARVELL INTERNATIONAL LTD. (BM)

( * ) Notice: Subject to any disclaimer, the term of this patent is extended or adjusted under 35 U.S.C. 154(b) by 340 days.

(21) Appl. No.: 14/153,244

(22) Filed: Jan. 13, 2014

Related U.S. Application Data

(60) Provisional application No. 61/752,793, filed on Jan. 15, 2013.

(51) Int. Cl.
| | | |
|---|---|---|
| H04N 7/18 | (2006.01) | |
| H04N 7/00 | (2011.01) | |
| H04N 5/30 | (2006.01) | |
| G06K 9/62 | (2006.01) | |

(52) U.S. Cl.
CPC .................................. G06K 9/6202 (2013.01)

(58) Field of Classification Search
None
See application file for complete search history.

(56) References Cited

U.S. PATENT DOCUMENTS

| | | | | | |
|---|---|---|---|---|---|
| 7,997,764 | B1* | 8/2011 | Nielson | .................... | E01F 9/615 340/907 |
| 2005/0157908 | A1* | 7/2005 | Matsugu | ............ | G06K 9/00342 382/107 |
| 2007/0047772 | A1* | 3/2007 | Matey | .................... | G06K 9/6255 382/117 |
| 2008/0031542 | A1* | 2/2008 | Lei | ........................ | G06K 9/6202 382/283 |
| 2008/0247607 | A1* | 10/2008 | Amano | .............. | G06K 9/00885 382/115 |
| 2009/0231483 | A1* | 9/2009 | Seddik | ................. | H04N 5/2256 348/373 |
| 2009/0278922 | A1* | 11/2009 | Tinker | ................. | G06K 9/0061 348/78 |
| 2010/0118266 | A1* | 5/2010 | Nixon | ................... | A61B 3/1173 351/206 |
| 2010/0171925 | A1* | 7/2010 | Czajka | ............... | G06K 9/00906 351/206 |
| 2011/0242304 | A1* | 10/2011 | Ichige | ................ | G06K 9/00107 348/77 |
| 2012/0057755 | A1* | 3/2012 | Berkvens | .............. | H05B 37/029 382/103 |
| 2012/0105586 | A1* | 5/2012 | Miesak | ............... | G06K 9/00013 348/46 |
| 2012/0206050 | A1* | 8/2012 | Spero | ........................ | B60Q 1/04 315/152 |
| 2012/0249013 | A1* | 10/2012 | Valois | ................. | H05B 37/0227 315/291 |
| 2013/0109406 | A1* | 5/2013 | Meador | ................. | H04L 67/125 455/456.1 |
| 2014/0015948 | A1* | 1/2014 | Tam | ........................ | A61B 90/30 348/77 |
| 2014/0084165 | A1* | 3/2014 | Fadell | .................... | G08B 17/00 250/340 |
| 2014/0085092 | A1* | 3/2014 | Fadell | ................. | H04L 12/6418 340/628 |

* cited by examiner

*Primary Examiner* — Frederick Bailey
*Assistant Examiner* — Talha M Nawaz

(57) ABSTRACT

Systems, methods, and other embodiments associated with image based control of lighting systems are described. According to one embodiment, an apparatus includes an imaging device configured to capture an image of a space. The apparatus also includes a matching logic configured to compare the image to templates in a set of templates to determine a current activity occurring in the space. In response to determining that the image matches a template, the matching logic is configured to generate a match signal that identifies the template. A control logic is configured to access one or more stored scenes. Each scene specifies a lighting setting for a controllable characteristic of at least one light fixture. The control logic selects a scene mapped to the identified template. The control logic further causes the controllable characteristic of the at least one light fixture to be adjusted to the lighting setting defined by the scene.

20 Claims, 7 Drawing Sheets

IMAGE-BASED CONTROL OF LIGHTING SYSTEMS

CROSS REFERENCE TO RELATED APPLICATIONS

This patent disclosure claims the benefit of U.S. Provisional Application Ser. No. 61/752,793 filed on Jan. 15, 2013, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A lighting control console (e.g., light board, lighting board, lighting desk, preset board) is an electronic device used in lighting design to control multiple lights at once. A lighting control console controls dimmers that control the intensity of the lights. Many modern consoles also control intelligent lighting that moves, and/or changes colors and patterns. Consoles vary in size and complexity, from small preset boards to dedicated moving light consoles. The purpose of typical lighting consoles is to consolidate control of the lights into an organized, easy-to-use, system so that a lighting designer can change lighting levels.

SUMMARY

In general, in one aspect this specification discloses an apparatus. The apparatus includes an imaging device configured to capture an image of a space. The apparatus also includes a matching logic configured to compare the image to templates in a set of templates to determine a current activity occurring in the space. In response to determining that the image matches a template, the matching logic is configured to generate a match signal that identifies the template. A control logic is configured to access one or more stored scenes. Each scene specifies a lighting setting for a controllable characteristic of at least one light fixture. The control logic is configured to select a scene mapped to the identified template. The control logic is further configured to cause the controllable characteristic of the at least one light fixture to be adjusted to the lighting setting defined by the scene.

In one embodiment, the apparatus further includes at least one template that depicts a location of an occupant of the space. In another embodiment, the apparatus includes at least one template that depicts an occupant engaged in an activity in the space. In one embodiment, the apparatus includes at least one template that depicts an operating condition of at least one electronic device in the space. In another embodiment, each scene defines lighting settings for a plurality of lights.

In one embodiment, the controllable characteristic comprises brightness of a specified light fixture. In one embodiment, the imaging device is configured to capture video having frames, and the matching logic is configured to determine if at least one frame matches a template.

In general, in another aspect, this specification discloses a method for image based control of lighting systems. The method includes, capturing an image of a space. The method further includes comparing the image to templates in a set of templates to determine a current activity occurring in the space. The method also includes generating a match signal that identifies a template selected as matching the image. The method includes selecting a scene based, at least in part on the identified template. A scene specifies lighting settings for at least one light fixture in the space. The method further includes changing a lighting setting of the at least one light fixture based, at least in part, on the scene.

In general, in another aspect, this specification discloses a system for image based control of lighting systems. The system includes an imaging device that captures an image of a space. In general, in another aspect, this specification discloses a system for image based control of lighting systems. The system includes an imaging device that captures an image of a space. The system also includes a lighting apparatus comprising a matching logic. The matching logic is configured to compare the image to templates in a set of templates to determine a current activity occurring in the space. In response to determining that the image matches a template, the matching logic is configured to generate a match signal that identifies the template. The system also includes a group of lighting fixtures. Each light fixture in the group of light fixtures has a control logic configured to access one or more stored presets, each preset identifying at least one lighting setting. The control logic is also configured to select a preset mapped to the identified template. The control logic is further configured to cause the corresponding light fixture to be adjusted to the lighting setting defined by the selected preset.

In one embodiment, the matching logic is further configured to identify a time of day that the image was captured and select a template subset by removing templates that do not correspond to the identified time of day. The matching logic is configured to compare the image to templates in the subset of templates.

In one embodiment, the imaging device is configured to capture an image in response to sensing motion in the space. In another embodiment, the imaging device is configured to capture a subsequent image at a predetermined time interval. In another embodiment, the imaging device is configured to capture video having frames and the matching logic is configured to determine if at least one frame in the video matches a template.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Modern lighting systems control a group of light fixtures to provide one or more "scenes" that are tailored to specific uses of a space. For example, a scene for watching television may have light fixtures nearest the television turned off and a lamp on an end table dimmed. A scene for reading may have the light fixtures nearest the television dimmed and the lamp on the end table set to full brightness, and so on. An occupant of a room selects, on a control console, a scene that is appropriate to the occupant's intended activity. When an occupant wishes to turn off the television and start reading a newspaper, she selects the reading scene for the lighting system. The lighting system will dim the light fixtures near the television and light the lamp on the end table to full brightness.

Described herein are examples of systems, methods, and other embodiments associated with image based control of lighting systems. Scenes for a space's lighting system are automatically selected based on how the space is being used. The systems, methods, and other embodiments described herein determine how the space is being used by observing the activities of occupants of the space and selecting an appropriate lighting scene. The occupant no longer has to manually select the scene.

In one embodiment, an imaging device is installed in a room to capture images of the room including the contents of the room. The images captured by the imaging device are compared to stored templates. The templates are pre-stored images of a room or area including contents/furniture in the room and activities being performed in the room. The templates may include images depicting an occupant watching television, reading a newspaper in a chair, or laying down on a couch or bed. A template that best matches the captured image is identified to determine the activity being performed in the room.

Each template is mapped to, or associated with, a scene. The scene that is mapped to the identified template is selected. The lighting settings (e.g., brightness, luminescence, color, and level) of the light fixtures are changed according to the selected scene. Each scene specifies predefined lighting settings for the light fixtures in the room that are suited to the activity. For example, in different scenes, indirect lighting and task lighting may be set to different levels appropriate to the activity associated with the scene. Accordingly, the lighting is changed by the system based on the activity that the system determines is being performed in the room without physical intervention by the occupant.

Figure 1:
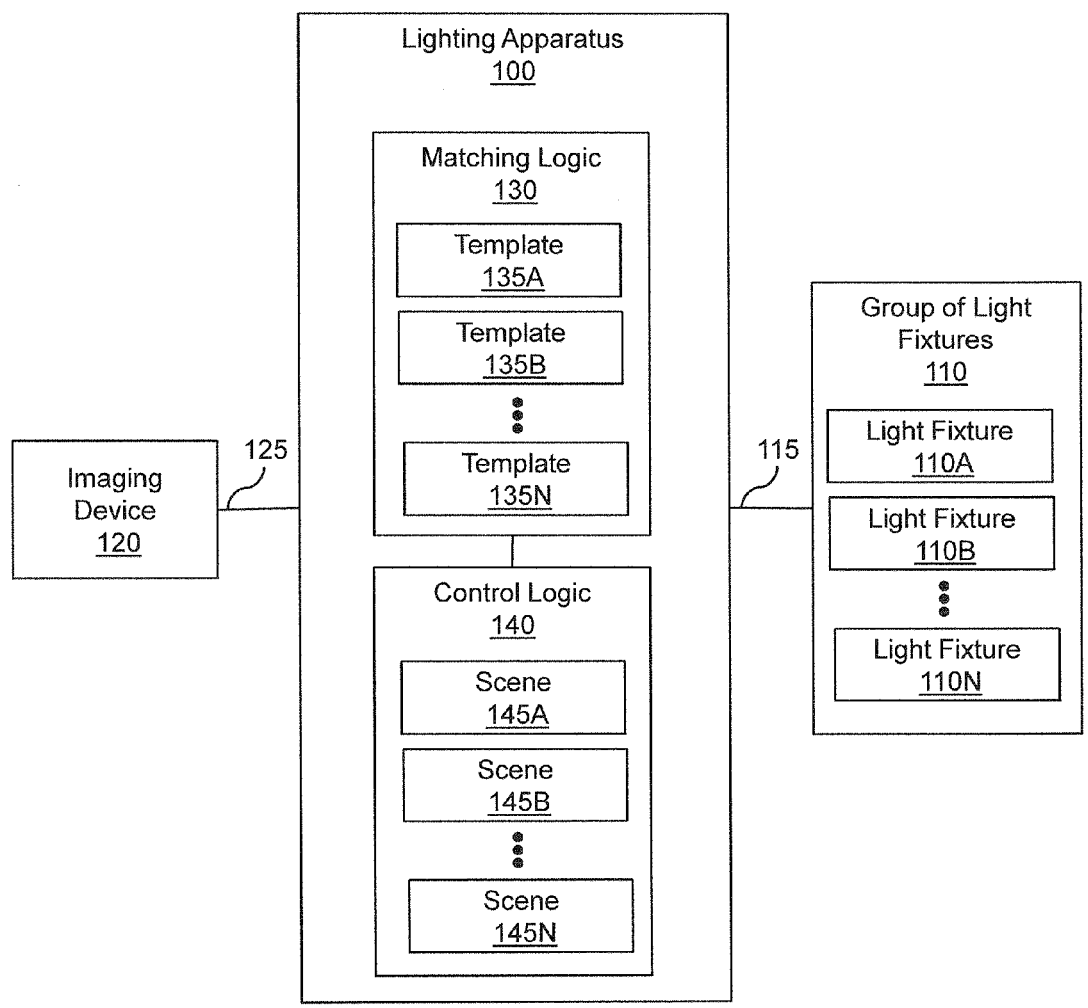
FIG. 1 illustrates one embodiment of a lighting apparatus associated with image-based control of lighting systems.

With reference to FIG. 1, one embodiment of a lighting apparatus 100 is shown that is associated with image-based control of a lighting system. The apparatus 100 may be implemented in a space, such as a room in a home having a group of light fixtures 110. Alternatively, the space may be an entire home, an office, restaurant, or other space having a group of light fixtures 110. Communication between the lighting apparatus 100 and the group of light fixtures 110 is through a hardwired connection having connection lines 115.

The lighting apparatus 100 has an operable connection to an imaging device 120. The imaging device 120 may be a camera or video camera that captures images of the space. For example, contents and/or occupants that are within the space are captured in the image. The imaging device 120 may capture a single image, continuous images, or images at a predetermined interval. In one embodiment, the imaging device 120 may have motion sensing capability and capture an image in response to detecting motion in the space. Communication between the lighting apparatus 100 and the imaging device 120 is through, for example, connection lines 125.

The lighting apparatus 100 includes a matching logic 130 and a control logic 140. The matching logic 130 stores templates 135A, 135B . . . 135N. The templates 135A-135N are configured to depict a condition of the contents and/or occupant(s) of the space that is associated with an activity occurring in the space. For example, the template 135A may depict the condition that an occupant is reading a newspaper at a specific location in the space, such as in a reading chair. The template 135A may be a generalized image of a person sitting in the reading chair while holding a newspaper or book.

Once the imaging device 120 captures an image of the room, the matching logic 130 attempts to determine the activity being performed by the occupant in the room by comparing the arrangement of the contents and/or occupants in room with the arrangement of the contents and/or occupants in the template. The matching logic 130 determines if the captured image matches any template in the set of templates. If, for example, the image depicts an occupant reading a newspaper, the matching logic 130 may determine that the image matches the template 135A. If the image does not match the template 135A, the matching logic 130 continues to compare the captured image with other templates in the set of templates. If and when a match is found, the matching logic 130 generates a match signal that identifies the template that best matches the image.

The control logic 140 receives the match signal. The control logic 140 stores scenes 145A, 145B . . . 145N. A scene specifies a lighting setting for a controllable characteristic of at least one light fixture in the group of light fixtures 110. Each scene is mapped to at least one template in the set of templates. The scene mapped to the identified template is selected by the control logic 140 from the set of scenes 145A-145N. For example, suppose scene 145A is mapped to template 135A. When the match signal identifies template 135A, the control logic 140 selects scene 145A. A lighting setting of at least one light fixture is changed based on the lighting settings from the selected scene. In one embodiment, the lighting setting controls other features in the room that affect light levels, such as shades or curtains that are configured to be controlled electronically.

The lighting apparatus 100 can be employed in different locations (e.g., different kinds of rooms). Accordingly, a variety of templates may be generated and configured to represent each room with different activities. The following example templates are configured for a location and depict contents (e.g., furniture in the location) and/or an occupant positioned to correspond with an activity. For example, one template depicts a bedroom with an occupant lying on a bed to represent the activity of sleeping. The corresponding scene defines sleep lighting in which the light fixtures are set to off or have a night light setting. Another template can depict a bedroom with an occupant holding a book and reclining against a headboard to represent the activity of reading. The corresponding scene defines reading light and may have a light fixture on a nightstand set to full brightness. When an image of the bedroom is captured, the image may be compared to templates of the bedroom as opposed to templates for a different location (e.g., dining area, home office, meeting room, ballroom).

In another example, a template may be configured for a dining area. The template may depict two occupants sitting at a dining table to represent the activity of eating. The corresponding scene defines dinner lighting with lighting settings set to dim the light fixtures. Another template can depict six occupants sitting at a dining room table to represent an activity of group dining. The corresponding scene defines full lighting with lighting settings for the light fixtures set to full brightness.

Templates may also be created for other rooms such as a home office. For example, suppose a template is configured to depict an occupant with their hands on a keyboard to represent the activity of typing. A scene corresponding to that template defines task lighting. The lighting settings for a keyboard light fixture and a light fixture behind the screen are set to full brightness. Templates may also be configured with additional information such a time interval. For example, a template may be configured to depict an occupant looking at a display screen to represent the activity of watching media. To corroborate that the occupant is watching media, rather than glancing in the direction of the display screen, the template may have a time interval (e.g., 3 minutes). When the time interval elapses, a scene corresponding to a person watching media on a display screen is selected and the light fixtures are adjusted accordingly.

Templates may also be created for business settings and be configured depict office locations (e.g., meeting room). For example, one template may be configured to depict a meeting room with chairs positioned around a table to represent the activity of participating in a conference. The corresponding scene defines meeting lighting in which the light fixtures over a table are set to full brightness. Another template can depict a meeting room with chairs facing a presentation screen to represent the activity of watching a presentation. The corresponding scene defines presentation lighting in which presentation screen light fixtures are set to dim and the light fixtures over the table are set to off.

Templates may also be created for public locations such a hotel. For example, one template may be configured to depict a hotel ballroom with chairs facing a stage to represent the activity of watching a seminar. The corresponding scene defines stage lighting in which stage light fixtures are set to full brightness and audience light fixtures are set to dim. Another template can depict chairs positioned around tables to represent the activity of reception dining. The corresponding scene defines dinner lighting in which the light fixtures among the tables are set to less than full brightness. The given example templates are configured to depict the activity occurring in the location. The lighting settings of light fixtures in the location are changed based on the scene mapped to the template.

When an occupant begins a different activity, the lighting settings of the group of light fixtures adapts to the new activity. For example, if the activity captured by the image is a person watching a television, the template corresponding to watching a television is selected. The template is mapped to a scene that includes lighting settings associated with watching TV. For example, the control logic 140 causes the light fixtures 110A and 110B to be dimmed to a predetermined level and causes light fixture 110N to be turned off. If the activity changes to reading a newspaper, a different scene would be selected by the control logic 140, because a different template would be identified by the matching logic 130 as matching the activity occurring in the room. The scene corresponding to reading a newspaper may dictate that the control logic 140 cause the light fixtures 110A and 110B to be turned off and the light fixture 110N to be turned on to a predetermined brightness level. Accordingly, a lighting setting of one or more light fixtures can be automatically adapted to the activity being performed in the room without manual intervention by an occupant.

Figure 2:
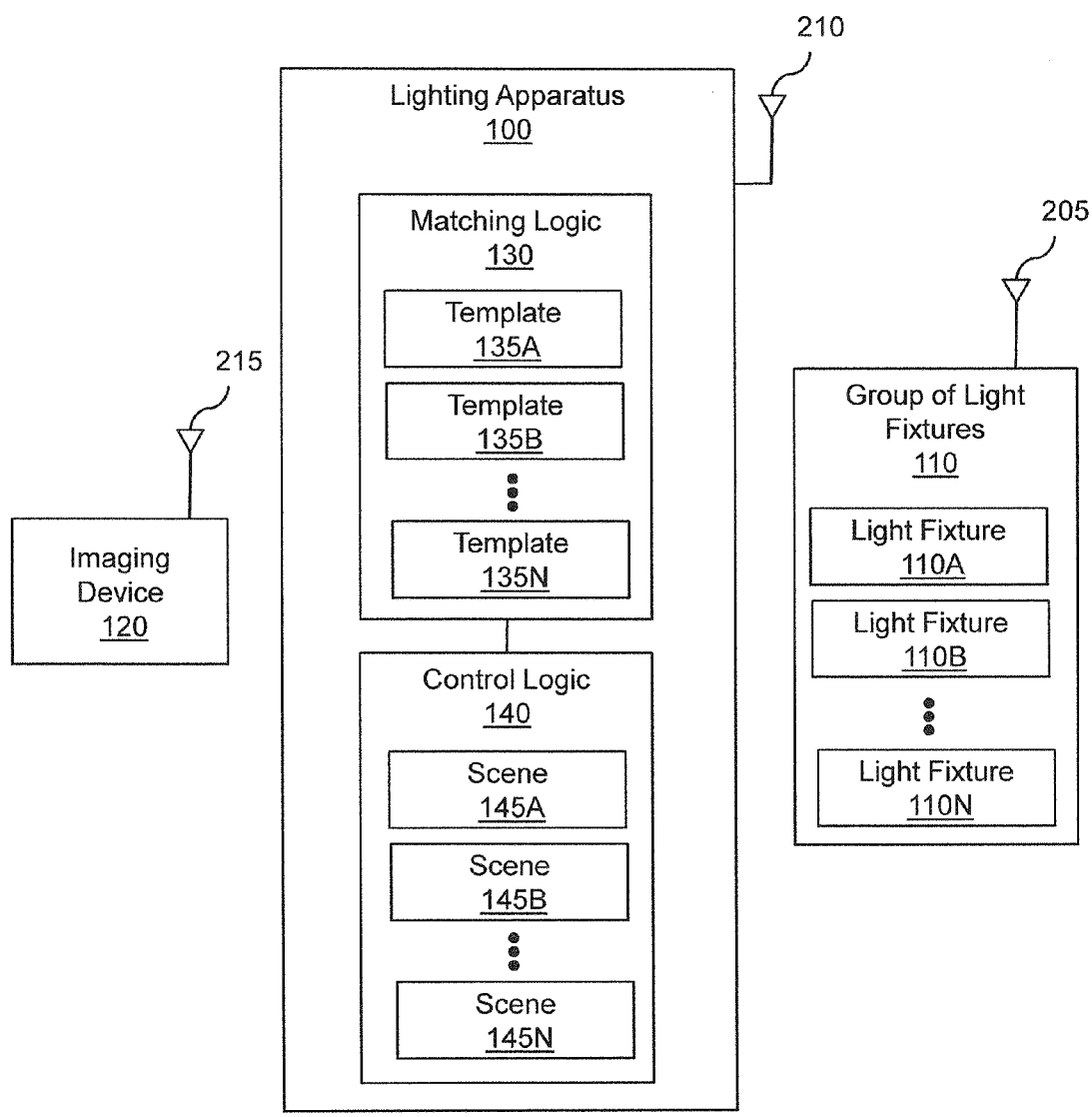
FIG. 2 illustrates one embodiment of a lighting apparatus associated with wireless image-based control of lighting systems.

FIG. 2 illustrates one embodiment of a wireless lighting apparatus 100 having stored templates and scenes. The group of light fixtures 110, imaging device 120, matching logic 130, and control logic 140 operate in a similar manner as described above with respect to FIG. 1. In the embodiment shown in FIG. 2, communications between the lighting apparatus 100, the group of light fixtures 110, and the imaging device 120 are through wireless transceivers 205, 210, and 215. Accordingly, the lighting apparatus 100, the group of light fixtures 110, and the imaging device 120 do not have to be hardwired to one another. In some embodiments, one of the connections between the lighting apparatus 100, the group of light fixtures 110, and the imaging device 120 are hardwired while in others it is wireless.

Figure 3:
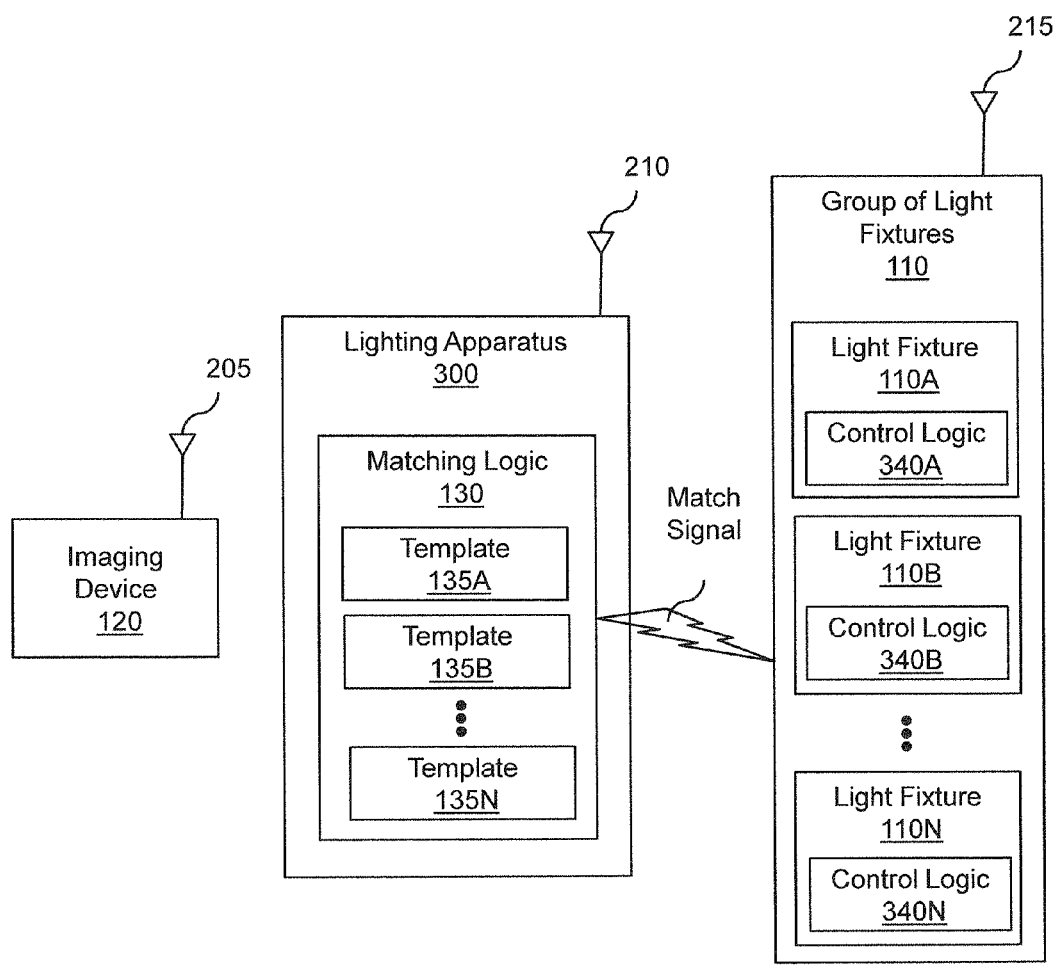
FIG. 3 illustrates another embodiment of the lighting apparatus associated with image-based control and having stored templates and presets to activate lighting systems.

FIG. 3 illustrates another embodiment of a lighting apparatus 300 having control logics associated with the individual light fixtures. In this embodiment, each light fixture 110A-110N has an associated control logic 340A-340N. Each control logic stores presets that pre-define lighting settings (e.g., on, off, dim) for the light fixture associated with that control logic. The presets are mapped to templates so that each light fixture has a predefined lighting setting for each template (e.g., "full" brightness for the reading template, "off" for the television template, and so on).

Once the imaging device 120 captures an image of the room, the matching logic 130 identifies a template that best matches the captured image to determine the activity occurring in the room. For example, suppose template 135A is configured to depict an occupant watching television. When an image is captured of an occupant watching television, the matching logic identifies template 135A as matching the image. The matching logic transmits a match signal that identifies the template 135A to the group of light fixtures 110. The match signal is received by each light fixture 110A-110N at their corresponding control logic 340A-340N.

Each control logic 340A-340N selects a preset for the corresponding light fixture 110A-110N that is mapped to the template identified in the match signal. In the given example, in response to receiving the match signal identifying template 135A, the control logic 340A actuates a "template 135A" preset for the light fixture 110A. The control logic 340B actuates a "template 135A" preset for the light fixture 110B that may result in a different lighting setting than that of light fixture 110A. When each light fixture is actuated to the preset for a given template, the group of light fixtures 110 together provides a lighting scene tailored to the activity associated with the template.

In another example, suppose an image is captured of an activity being performed in the room that corresponds to template 135B. During the comparison process, template 135B is matched to the image. A match signal identifying template 135B is sent by the matching logic 130 to the control logics 340A-340N. In response to receiving the match signal identifying template 135B, the control logic 340A actuates a preset for the light fixture 110A that is mapped to the template 135B. The control logic 340B actuates a preset for the light fixture 110B that is mapped to the template 135B. Each of the control logics 340A-340N has presets that specify lighting settings for their corresponding light fixture 110A-110N. Differences in the lighting settings may be based on the size of light fixtures, the location of light fixtures, and so on.

Figure 4:
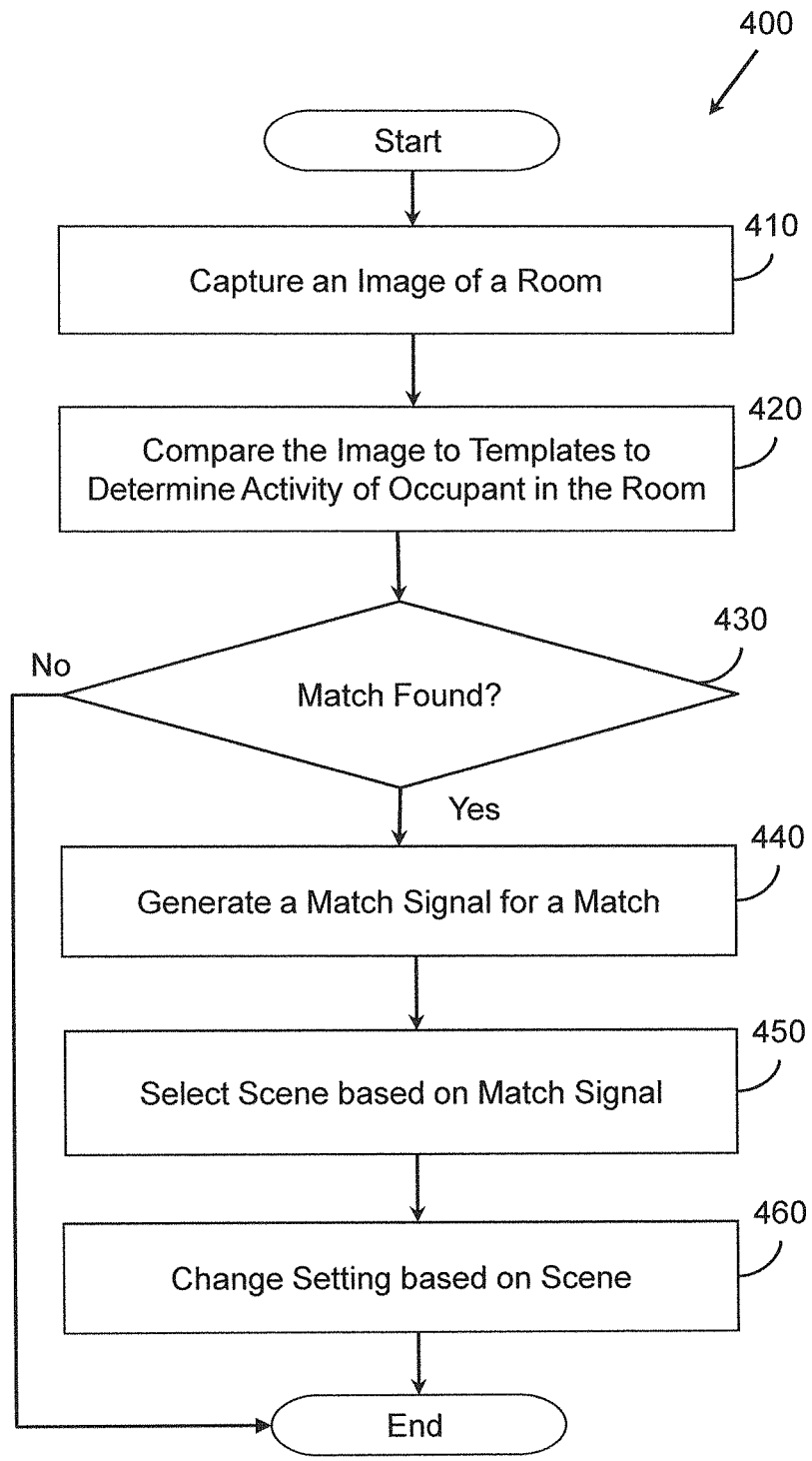
FIG. 4 illustrates one embodiment of a method associated with image-based control of lighting systems.

FIG. 4 illustrates one embodiment of a method associated with image-based control of lighting systems previously described with respect to FIG. 1. At 410, an image of a room is captured by an imaging device. In one embodiment, an image is captured at a predetermined interval. For example, an image may be captured every ten seconds. The interval may be based on a number of factors such as the time of day. A room that is rarely used during daylight hours may have a longer predetermined interval during the day. If use of the room increases after sunset, the predetermined interval may be decreased in the evening so that images capture changes in activities more quickly.

At 420, the captured image is compared to a set of templates to determine the activity of an occupant in the room. The set of templates may include all templates. In another embodiment, the set of templates may be initially reduced to increase the efficiency of finding a matching template for an image. For example, the set of templates may be reduced to activities typically performed in the room at the time that the image was captured. If a matching template is not found in the reduced number of templates, the search may be expanded to include more templates until a match is found. At 430 it is determined if a match is found. If it is determined that a match is not found, the method is finished and the lighting settings of the light fixtures are not changed. If it is determined that a match is found the method proceeds to 440. At 440, a match signal is generated that identifies the template selected as matching the image. At 450, a scene is selected based on the template identified by the match signal. As previously described, the scene defines at least one lighting setting for at least one light fixture. At 460, the lighting setting of the at least one light fixture is changed based on the lighting setting defined in the scene.

Figure 5:
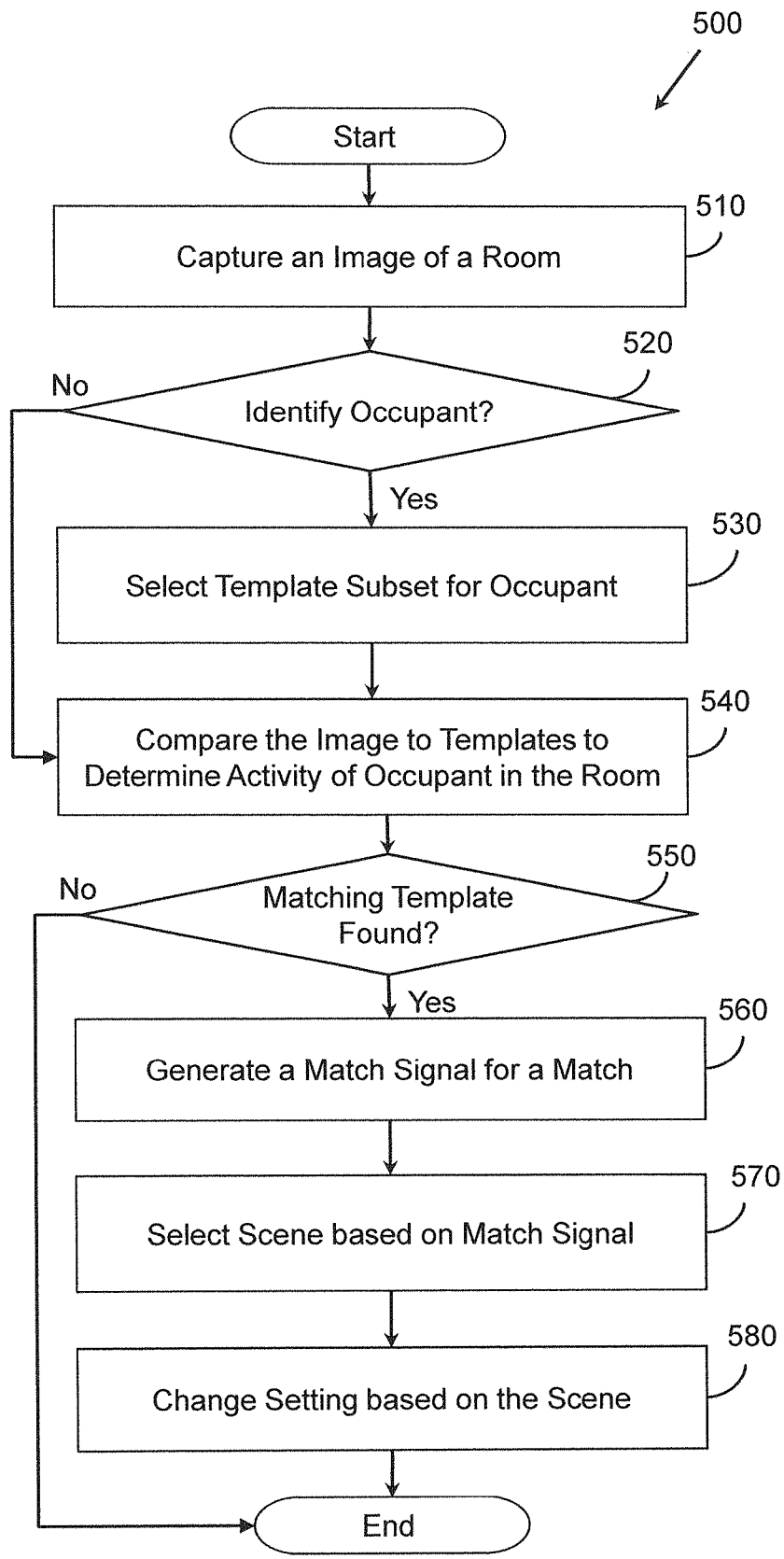
FIG. 5 illustrates one embodiment of a method associated with image-based control and including occupant identification techniques to activate lighting scenes.

FIG. 5 illustrates one embodiment of a method 500 associated with image-based control of lighting systems that attempt to identify an occupant. At 510, an image is captured by an imaging device. At 520, it is determined whether an occupant present in the image is identified. In one embodiment, a human form is identified using features (e.g., body type, facial features) to determine the identity of the occupant. If at 520 an occupant is not identified in the image, the method 500 proceeds to 540 and the image is compared to pre-stored templates as previously described.

If the occupant is identified in the image, the method 500 proceeds to 530. At 530, a subset of templates is selected that are mapped to the identified occupant. The number of templates is reduced to increase the efficiency of comparing the image to templates which occurs at 540 to determine the activity of the occupant in the room. At 550 it is determined if a match is found. If it is determined that a matching template is not found, the method is finished and the lighting settings of the light fixtures are not changed. If it is determined that a matching template is found the method proceeds to 560. At 560, a match signal is generated when the image is matched to a template. At 570, a scene is selected based on the template identified in the match signal. As previously described the scene defines at least one lighting setting for at least one light fixture. At 580, the lighting setting of the at least one light fixture is changed based on the lighting setting defined in the scene.

Figure 6:
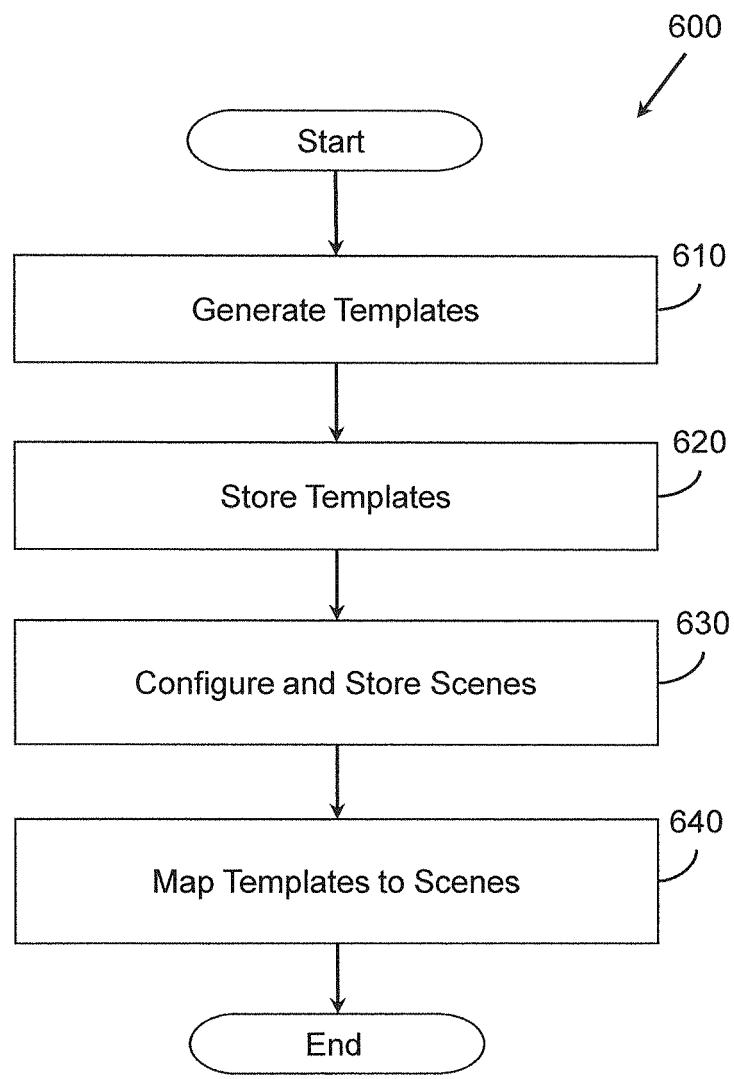
FIG. 6 illustrates one embodiment of a method associated with generating and storing templates and scenes for image-based control of lighting systems.

FIG. 6 illustrates one embodiment of a method 600 associated with storing templates and scenes for image-based control of lighting systems. At 610, templates are generated. The templates are generated by capturing images of the space including the contents of the space. The contents include both the inanimate objects in the space as well as an occupant engaged in an activity. If multiple persons will be using the space, the templates may be generated to include images of one or more occupants engaged in the same activity or different activities. At 620, templates are stored.

At 630, scenes are configured and stored. Each scene specifies different lighting settings such as brightness, luminescence, color, level for the light fixtures in the space. At 640, the scenes are mapped to templates such that each template corresponds to a particular scene. A scene may be mapped to one or more templates. A scene is mapped to a template based on the desired lighting settings for an activity represented in a template. For example, a template for an occupant reading a newspaper and a template for an occupant reading a book may both be mapped to the same scene (e.g., a "reading" scene).

Figure 7:
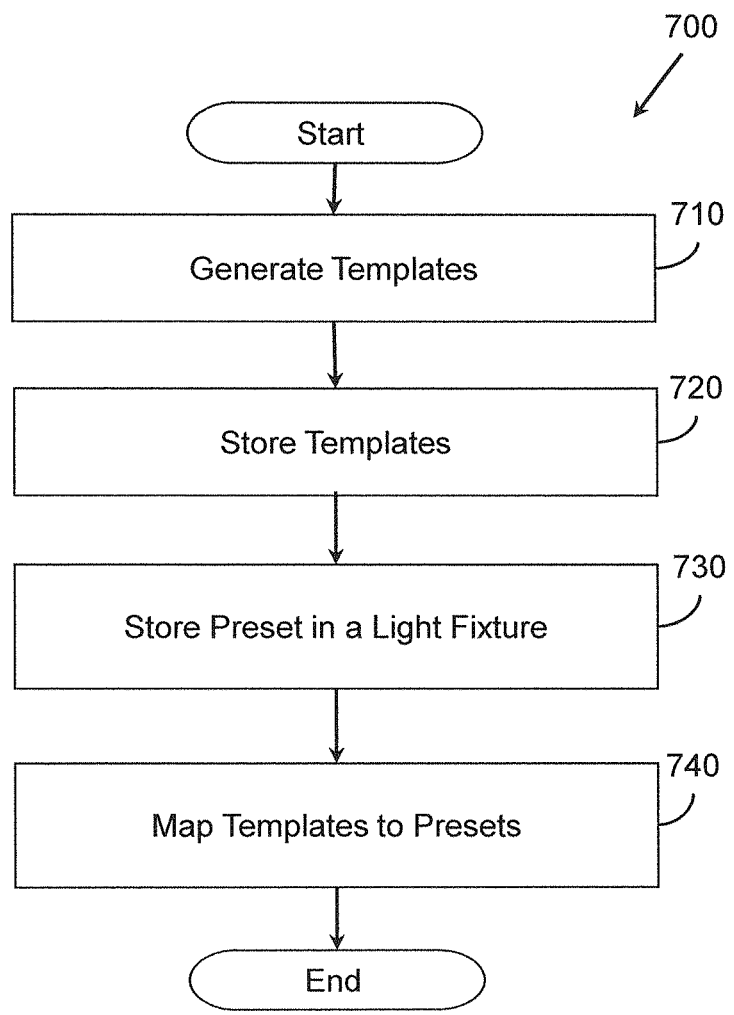
FIG. 7 illustrates one embodiment of a method associated with generating and storing templates and presets for image-based control of lighting systems.

FIG. 7 illustrates one embodiment of a method 700 associated with storing templates and presets for image-based control of lighting systems. In an embodiment where a control logic is associated with each light fixture, templates are mapped to presets stored in the control logic. Templates are generated and stored in the same manner as described with respect to method 600 shown in FIG. 6. At 730, presets are stored for at least one light fixture. A preset stores predefined lighting settings for a light fixture.

At 740, the presets are mapped to templates such that each template is mapped to a particular preset of a light fixture. In this manner, the lighting settings of the light fixtures can be changed based on the information stored in the presets in response to a different template being selected.

Described herein have been examples of systems, methods, and other embodiments associated with image based control of lighting systems. These examples allow an occupant to change the lighting in a room by beginning the activity that the occupant wishes to perform. Manual intervention by the occupant to select a predetermined lighting pattern is not required.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

What is claimed is:

1. An apparatus, comprising:
    an imaging device positioned in a first room and configured to capture an image of a space in the first room, wherein the image captures an arrangement of contents and occupants in the first room;
    a matching logic configured to:
        compare the image of the first room and the arrangement of contents in the image to template images of the first room from a set of templates, wherein each template image of the first room is an image representing a different arrangement of contents, occupants, and an activity in the first room; and
        in response to determining that the arrangement of contents, occupants, and activity in the image matches the arrangement of contents, occupants, and activity in one of the template images of the first room, generate a match signal that identifies the template image that matched; and
    a control logic configured to:
        access one or more stored scenes, wherein each scene specifies a lighting setting for a controllable characteristic of at least one light fixture, and wherein each of the template images is mapped with one of the stored scenes;
        select a scene that is mapped to the identified template image that matched the image; and
        cause the controllable characteristic of the at least one light fixture in the first room to be adjusted to the lighting setting defined by the scene.

2. The apparatus of claim 1, wherein at least one template image from the set of templates depicts a location of an occupant of the space.

3. The apparatus of claim 1, wherein at least one template image from the set of templates depicts an occupant engaged in an activity in the space.

4. The apparatus of claim 1, wherein at least one template image from the set of templates depicts an operating condition of at least one electronic device in the space.

5. The apparatus of claim 1, wherein each scene defines lighting settings for a plurality of lights.

6. The apparatus of claim 1, wherein the controllable characteristic comprises brightness of a specified light fixture.

7. The apparatus of claim 1, wherein the imaging device is configured to capture video having frames, and wherein the matching logic is configured to determine if at least one frame matches a template image from the set of templates.

8. A method, comprising:
    capturing, by an imaging device, an image of a space, wherein the image captures an arrangement of contents and occupants in an activity in the space, wherein the imaging device communicates the image to a computing device;
    comparing, by the computing device, the image to template images of the space from a set of templates, wherein each template image of the space is an image representing a different arrangement of contents, occupants, and an activity in the space;
    in response to determining that the arrangement of contents, occupants, and activity in the image matches the arrangement of contents, occupants, and activity in one of the template images of the space, generating a match signal that identifies the template image selected as matching the image;
    selecting a scene based, at least in part on the identified template image, wherein a scene specifies lighting settings for at least one light fixture in the space; and
    changing a lighting setting of the at least one light fixture based, at least in part, on the scene.

9. The method of claim 8, further comprising:
    identifying an occupant in the image; and
    selecting a template subset from the set of templates, wherein the template subset is a subset of templates that are mapped to the occupant; and
    wherein the comparing comprises comparing the image to template images in the subset of templates.

10. The method of claim 9, further comprising:
when the occupant is not identified, comparing the image to template images in the whole set of templates.

11. The method of claim 8, wherein at least one template image depicts an activity being performed by an occupant of the space.

12. The method of claim 8, wherein each scene defines lighting settings for a plurality of light fixtures.

13. A system comprising:
an imaging device that captures an image of a space, wherein the image captures an arrangement of contents and occupants in the space;
a lighting apparatus comprising a matching logic stored in a non-transitory computer storage medium including instructions that when executed by a processor cause the processor to:
compare the image of the space and the arrangement of contents in the image to template images of the space from a set of templates, wherein each template image of the space is an image representing a different arrangement of contents, occupants, and an activity in the space; and
in response to determining that the arrangement of contents, occupants, and activity in the image matches the arrangement of contents, occupants, and the activity in one of the template images of the space, generate a match signal that identifies the template image that matched; and
a group of lighting fixtures, each light fixture having a control logic configured to:
access one or more stored presets, each preset identifying at least one lighting setting;
select a preset mapped to the template image identified by the match signal; and
cause the corresponding light fixture to be adjusted to the lighting setting defined by the selected preset.

14. The system of claim 13, wherein at least one template image from the set of templates depicts a location of an occupant of the space.

15. The system of claim 13, wherein at least one template image from the set of templates depicts an occupant engaged in an activity in the space.

16. The system of claim 13, wherein at least one template image from the set of templates depicts an operating condition of at least one electronic device in the space.

17. The system of claim 13, wherein the matching logic is further configured with instructions that when executed by the processor cause the processor to:
identify a time of day that the image was captured; and
select a template subset from the set of templates by removing template images that do not correspond to the identified time of day; and
compare the image to template images in the subset of templates.

18. The system of claim 13, wherein the imaging device is configured to capture an image in response to sensing motion in the space.

19. The system of claim 13, wherein imaging device is configured to capture a subsequent image at a predetermined time interval.

20. The system of claim 13, wherein the imaging device is configured to capture video having frames, and wherein the matching logic is configured to determine if at least one frame in the video matches a template.

* * * * *